(12) United States Patent
Dong et al.

(10) Patent No.: US 7,643,671 B2
(45) Date of Patent: Jan. 5, 2010

(54) FACIAL RECOGNITION SYSTEM AND METHOD

(75) Inventors: Kenneth Dong, Newton, MA (US);
Elena Dotsenko, Derwood, MD (US)

(73) Assignee: Animetrics Inc., Conway, NH (US)

( * ) Notice: Subject to any disclaimer, the term of this patent is extended or adjusted under 35 U.S.C. 154(b) by 487 days.

(21) Appl. No.: 10/761,667

(22) Filed: Jan. 21, 2004

(65) Prior Publication Data

US 2005/0008199 A1 Jan. 13, 2005

Related U.S. Application Data

(60) Provisional application No. 60/457,132, filed on Mar. 24, 2003.

(51) Int. Cl.
*G06K 9/00* (2006.01)
*G06T 15/50* (2006.01)

(52) U.S. Cl. .................... 382/154; 345/426
(58) Field of Classification Search .............. 382/154
See application file for complete search history.

(56) References Cited

U.S. PATENT DOCUMENTS

| | | | |
|---|---|---|---|
| 5,159,361 A | | 10/1992 | Cambier et al. |
| 5,742,291 A | | 4/1998 | Palm |
| 5,825,936 A | | 10/1998 | Clarke et al. |
| 5,844,573 A | | 12/1998 | Poggio et al. |
| 5,898,438 A | | 4/1999 | Stewart et al. |
| 5,990,901 A | | 11/1999 | Lawton et al. |
| 5,995,639 A | * | 11/1999 | Kado et al. ............. 382/118 |
| 6,094,199 A | | 7/2000 | Turkiyyah et al. |
| 6,142,876 A | * | 11/2000 | Cumbers ............. 463/25 |
| 6,226,418 B1 | | 5/2001 | Miller et al. |
| 6,249,600 B1 | | 6/2001 | Reed et al. |
| 6,263,089 B1 | | 7/2001 | Otsuka et al. |
| 6,296,317 B1 | | 10/2001 | Ollis et al. |
| 6,320,578 B1 | | 11/2001 | Shiitani et al. |
| 6,362,833 B2 | | 3/2002 | Trika |
| 6,366,282 B1 | | 4/2002 | Trika |
| 6,381,346 B1 | | 4/2002 | Eraslan |
| 6,434,278 B1 | | 8/2002 | Hashimoto |
| 6,529,626 B1 | | 3/2003 | Watanabe et al. |

(Continued)

FOREIGN PATENT DOCUMENTS

EP 1039417 A1 9/2000

(Continued)

OTHER PUBLICATIONS

Weisstein, "Matrix Norm," Dec. 22, 2003, http://mathworld.wolfram.com/MatrixNorm.html (2 pages).

(Continued)

*Primary Examiner*—Bhavesh M Mehta
*Assistant Examiner*—David P Rashid
(74) *Attorney, Agent, or Firm*—Wilmer Cutler Pickering Hale and Dorr (57) ABSTRACT

A facial identification system corrects lighting and pose in images prior to comparison with stored images. A three dimensional image is created from an original two dimensional image by combining the image with shape information. An iterative process is used to adjust the shape in order to match the original two dimensional image. A final image is rendered, with adjustments for lighting and pose, from the shape information.

9 Claims, 4 Drawing Sheets

U.S. PATENT DOCUMENTS

| | | | |
|---|---|---|---|
| 6,532,011 | B1 | 3/2003 | Francini et al. |
| 6,556,196 | B1 | 4/2003 | Blanz et al. |
| 6,606,096 | B2 * | 8/2003 | Wang .................. 345/473 |
| 2001/0038713 | A1 | 11/2001 | Kitagawa et al. |
| 2002/0012454 | A1 | 1/2002 | Liu et al. |
| 2002/0013684 | A1 * | 1/2002 | Toyama et al. ............ 703/2 |
| 2002/0106114 | A1 | 8/2002 | Yan et al. |
| 2003/0099409 | A1 | 5/2003 | Rowe |
| 2003/0123713 | A1 | 7/2003 | Geng |
| 2003/0169906 | A1 | 9/2003 | Gokturk et al. |
| 2006/0204069 | A1 | 9/2006 | Le Bras et al. |

FOREIGN PATENT DOCUMENTS

| | | |
|---|---|---|
| EP | 1143375 | 10/2001 |
| EP | 1204069 A2 | 5/2002 |
| WO | WO-01/63560 | 8/2001 |

OTHER PUBLICATIONS

Weisstein, "Projective Geometry" Dec. 22, 2003, http://mathworld.wolfram.com/ProjectiveGeometry.html (3 pages).

Hsu, R-L and Jain, A. "Face Modeling For Recognition," Proceedings 2001 International Conference on Image Processing. ICIP 2001. Thessaloniki, Greece, Oct. 7-10, 2001, International Conference on Image Processing, New York, NY: IEEE, US, vol. 1 of 3. Conf. 8, Oct. 7, 2001 pp. 693-696, XP010563858 ISBN: 0-7803-6725-1.

Tang, L-A, and Huang, T. S., "Face Recognition Using Synthesized Intermediate Views," Circuits and Systems, 1995, Proceedings of the 38th Midwest Symposium on Rio De Janeiro, Brazil Aug. 13-16, 1995, New York, NY USA, IEEE, US, pp. 1066-1069, XP010165313 ISBN: 0-7803-2792-4.

European Patent Office, Communication Pursuant to Article 96(2) EPC issued for EP04718062.5, Sep. 21, 2007.

Eriksson et al., "Towards 3-dimensional face recognition," IEEE Cape Town, (Sep. 28, 1999), pp. 401-406.

International Search Report issued for PCT/US04/006604, dated Sep. 2, 2004.

International Search Report issued for PCT/US04/006614, dated Aug. 26, 2004.

International Search Report issued for PCT/US04/006827, dated Aug. 26, 2004.

Lanitis et al., "Toward Automatic Simulation of Aging Effects on Face Images," IEEE Transactions on Pattern Analysis and Machine Intelligence, vol. 24, No. 4 (Apr. 2002), pp. 442-455.

Lee et al., "3-D deformable face model for pose determination and face synthesis," IEEE Computer Society, (Sep. 27, 1999) pp. 260-265.

Lopez et al., "3D head pose computation from 2D images: templates versus features," IEEE Computer Society, vol. 3 (Oct. 23, 1995), pp. 599-602.

Pighin et al., "Synthesizing realistic facial expressions from photographs," Computer Graphics Conference Proceedings, (Jul. 19, 1998), pp. 75-84.

* cited by examiner

FACIAL RECOGNITION SYSTEM AND METHOD

This application claims the benefit of U.S. Provisional Application Ser. No. 60/457,132, filed Mar. 24, 2003.

BACKGROUND OF THE INVENTION

1. Field of the Invention

The present invention relates to systems and methods for automatic facial recognition, including one-to-one and one-to-many correlations. More particularly, it relates to a system for correcting pose or lighting prior to determining recognition.

2. Discussion of Related Art

Automated facial recognition systems, used to identify individuals from images of faces, have existed for some time. There are several different types of facial recognition systems. In all such systems, a newly acquired image is compared to one or more stored images. Generally, facial recognition systems can be separated into two categories: authentication systems and identification system.

Authentication systems are used to verify the identity of a specific individual, typically to provide access to various resources. For example, an authentication system may use facial recognition to determine whether the individual should be allowed to enter various secured locations or resources, such as computer files, programs, etc. In an authentication system, a image is acquired of the person to be identified. The image is compared to a single image from a database of persons who are permitted access. The single image for comparison is determined based upon additional identifying information in the database, such as a name. In authentication systems, it is important to prevent access by unauthorized persons. The system needs to be able to determine a match with a very high degree of precision in order to preclude people with makeup or disguises.

Identification systems are used to identify an unknown individual by comparing a specific image to multiple images in a database. For example, an image from a security camera may be compared to a database of known criminals to seek to identify the perpetrator of a crime. The image is compared to all of the images in the database to determine one or more closest matches. While the precision of the match is not as important as in authentication systems, and identification system needs to be able to recognize the true identity of a person who may be trying to hide his or her features.

In both authentication systems and identification systems, the images are processed in various ways to determine matches. In some systems, the images are analyzed to locate specific facial features. The relative locations of the facial features are compared to determine a match. In other systems, the entire image is analyzed to determine relationships between light and dark areas in the image. In any type of facial identification system, variations in the conditions under which an image is acquired can affect the characteristics of an image and the ability of the system to determine matches. For example, differences in lighting change the shadowing on the face and the associated light and dark areas. For best results, a face should be illuminated by a uniform light from the front. Furthermore, differences in pose can affect characteristics of the image. For best results with matching, the individual should look directly at the camera. If an individual is looking in a different direction, the distances between facial features change due to differences in perspective. Generally, authentication systems provide more uniform images than for identification systems. The individuals are cooperative and can be directed to look directly at a camera with proper illumination for acquiring the images, both for the database and for the comparison image. Often, in an identification system, the subject is not cooperative and lighting conditions are poor. Therefore, a need exists for a system which allows modification of images to correct for differences in lighting or pose, in either identification systems or authentication systems.

A facial image is affected by coloring of the individual as well as by the shape of the individuals head. For improved reliability in comparisons, information about facial shape can be acquired as well as a two dimensional, color images. Three dimensional cameras are known and used in some systems for capturing images and making comparisons. With a three dimensional camera, shape information is acquired. With shape information, the images can be modified to remove differences in pose prior to comparison. However, three dimensional cameras are more expensive and more complicated than simple two dimensional cameras. Furthermore, a three dimensional camera generally requires a cooperative individual who maintains a single pose for sufficient time to acquire a proper image. Therefore, a need exists for a system which utilizes shape information for making facial image comparisons without the need for a three dimensional camera.

SUMMARY OF THE INVENTION

The present invention substantially overcomes the deficiencies of the prior art by providing a facial recognition system which processes images to correct for lighting and pose prior to comparison. According to another aspect of the invention, the images are corrected for lighting and pose by using shape information. The system processes a two dimensional image of a face to create a three dimensional image of the face. The three dimensional image is manipulated to change the pose and lighting characteristics. Finally, the modified three dimensional image is converted back to a two dimensional image prior to processing for recognition. According to another aspect of the invention, the three dimensional image is manipulated to be facing forward and with a diffuse light from the front.

According to an aspect of the invention, a plurality of two dimensional images of faces of individuals are processed to create three dimensional images. The three dimensional images are manipulated to change the pose and lighting characteristics to achieve uniformity among the plurality of images. The three dimensional images are stored in a database for later comparison with another image. According to another aspect of the invention, the three dimensional images are converted into two dimensional images before being stored in a database. According to another aspect of the invention, the three dimensional images are manipulated to be facing forward and with a diffuse light from the front. According to another aspect of the invention, a two dimensional image is compared with at least one of the images in the database to determine whether a match exists. According to another aspect of the invention, a two dimensional image is compared to a set of images in the database to determine a relative value of a match.

According to another aspect of the invention, a facial recognition system compares a newly acquired image of a face to images of faces in a database to determine a match. The newly acquired image includes one or more two dimensional images. The system processes the one or more two dimensional images to create a three dimensional image of the face. The three dimensional image is manipulated to change the pose and lighting characteristics. According to an aspect of the invention, the three dimensional image is manipulated to be facing forward and with a diffuse light from the front. The three dimensional image is processed to create a second two dimensional image. The second two dimensional image is compared with images in the database to determine whether a match exists.

According to another aspect of the invention, an iterative process is used to create the three dimensional image from the original two dimensional image. An initial shape is used with data from the two dimensional image to create a three dimensional shape. The three dimensional shape is iteratively adjusted to match the original image. According to an aspect of the invention, at each iteration, a two dimensional image is rendered from the three dimensional image. The rendered two dimensional image is compared to the original image. The three dimensional shape is adjusted based upon the differences between the images. According to another aspect of the invention, the three dimensional shape is determined based upon estimates of lighting in the original image. According to another aspect of the invention, the three dimensional shape is determined based upon estimates of pose in the original image.

DETAILED DESCRIPTION

The present invention relates to an improved method and apparatus for facial recognition. Generally, various facial recognition systems are known. In such systems, one or more images are compared with one or more previously stored images to determine whether a match exists. Typically, facial recognition systems fall into two categories, authentication and identification. An authentication system is used to determine whether a person is who he claims to be. The authentication system includes a database having images and identification information regarding a set of people. A specific image is retrieved based upon the identification information. The retrieved image is compared to a newly acquired image of the person to determine whether a match exists. If the images are sufficient similar, then the person is determined correspond to the stored person. Authentication systems can be used to control access to secure locations or information. If the person matches the stored image, then access is allowed. Otherwise, access is denied. In identification systems, the person needs to be identified. A newly acquired image of the individual is compared to the entire database of images to determine whether a match exists. Such systems are used to determine identity when the person is unable or unwilling to provide identification. The method and apparatus of the present invention can be used with any type of facial recognition system.

Figure 1:
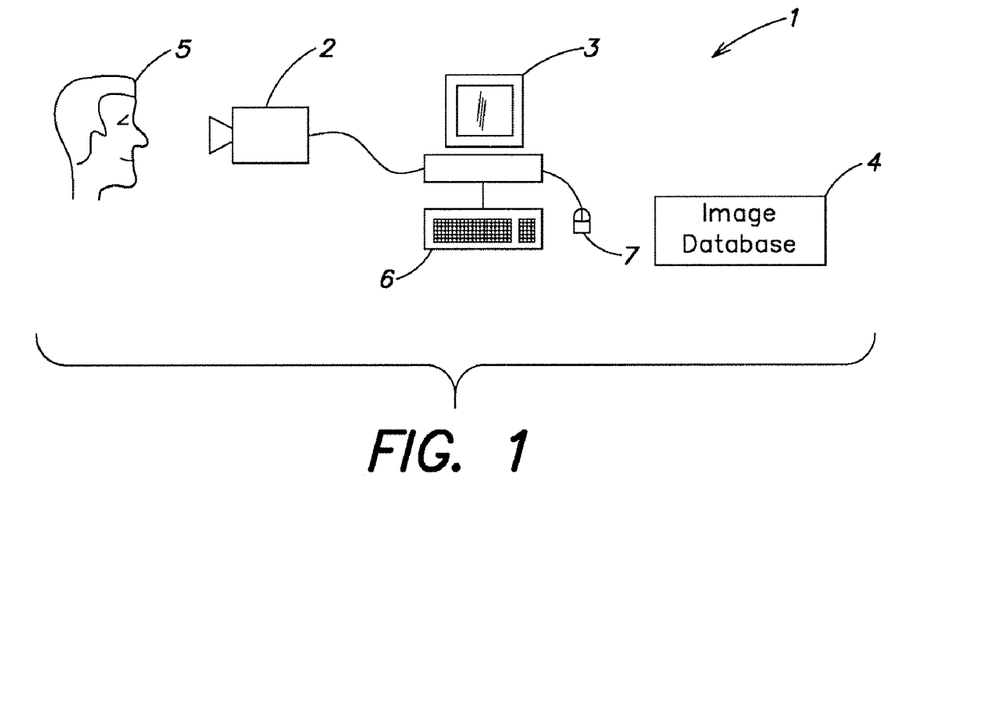
FIG. 1 illustrates hardware used in connection with an embodiment of the present invention.

FIG. 1 illustrates hardware for use in a facial recognition system 1 according to an embodiment of the present invention. The facial recognition system includes a camera 2 and a computer 3. The computer 3 is illustrated as a personal computer, but may be of any known type. The computer 3 may be a single computer or may include a plurality of computers on a network. Similarly, the computer 3 may be directly connected to the camera 2 as illustrated in FIG. 1 or may be connected through one or more intermediate computers or communication devices. The camera 2 may be connected in any known manner to the computer 3, including wires, infrared, rf or other connection mechanism. The system 1 also includes an image database 4. The image database 4 may be in the memory of the computer 3 or may be stored separately. It may be stored in any known medium, such as RAM, ROM, CD-ROM, etc. The camera 2 is used to acquire an image of a person 5 for use in the facial recognition system 1. It may be a video camera, still camera or three dimensional camera, in color or monochrome. Alternatively, infrared or ultraviolet cameras could be used. Additionally, the camera 2 may be replaced with another device for inputting an image. For example, a stored image may be inputted to the system using a scanner, a disk drive, a tape drive, a DVD player, a VCR, or other device. As illustrated in FIG. 1, the computer 3 may include input devices such as a keyboard 6 and mouse 7. Other devices and hardware may be used in connection with the present invention.

Figure 2:
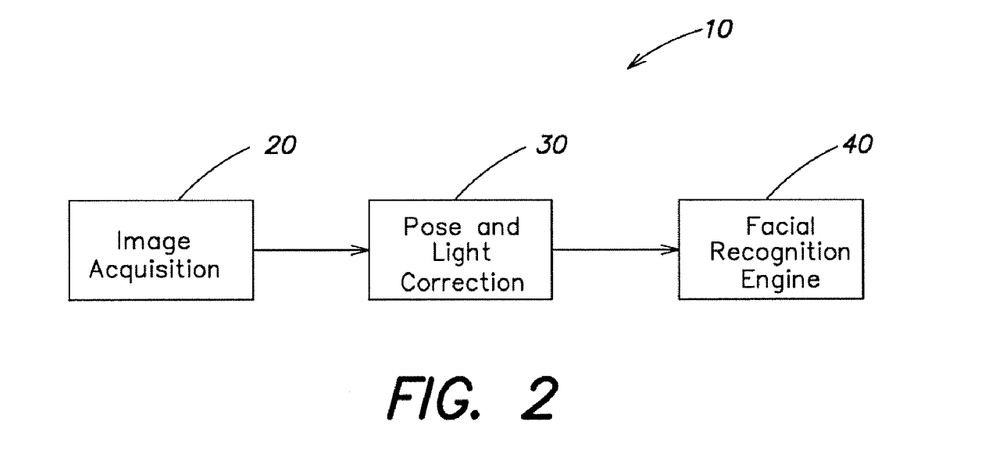
FIG. 2 is a block diagram of a process for determining facial recognition according to an embodiment of the present invention.

FIG. 2 illustrates a method 10 for processing images according to an embodiment of the present invention. The computer 3 is programmed to carry out the steps in the process. The process has three principal steps: image acquisition 20, pose and light correction 30, and facial recognition 40. Facial recognition 40 operates according to known processes as discussed below. However, the accuracy of a facial recognition system is limited by variations in lighting, pose and expression of the subject. In some situations, the images can be acquired in a controlled setting with consistent lighting, pose and expression. However, typically, the images are not acquired in a controlled setting. For example, an identification system can be used to determine the identity of an individual on a tape from a security camera. The lighting, pose, expression and angle of the image are all likely to be poor. Therefore, the accuracy of the facial recognition system can be increased by processing the image to correct for lighting and pose according to the present invention. The image acquisition 20 and pose and light correction 30 steps are used to produce uniform images for increased accuracy.

Figure 3:
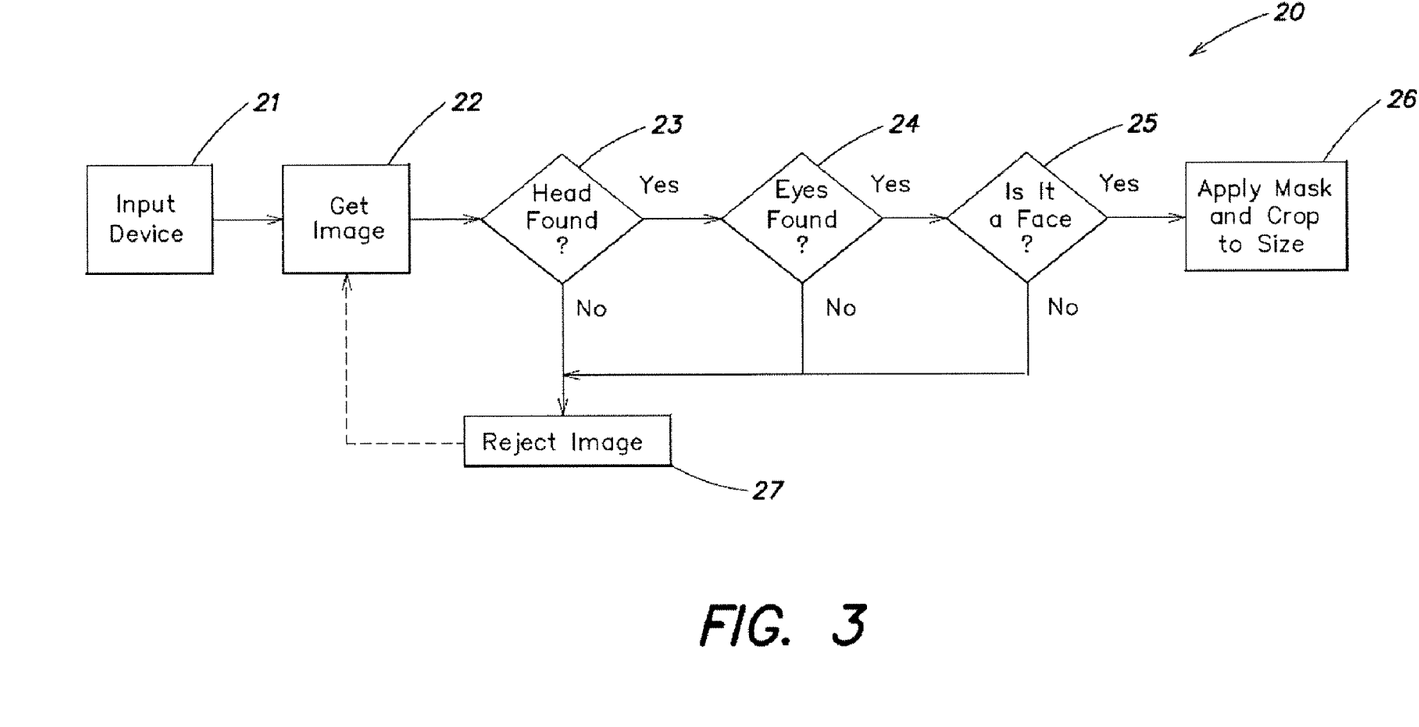
FIG. 3 is a block diagram of a process for acquisition of an image according to an embodiment of the present invention.

The process for acquiring an appropriate image is set forth in greater detail in the flow diagram of FIG. 3. The input device 21 is used to acquire an image. As noted above, the input device may be a camera or any other device or inputting an image. At step 22, the image is acquired, such as by taking a snapshot with a camera. The system may acquire the image automatically or under control of an operator. The image is then processed to determine whether it includes a face, according to generally known methods. For example, as illustrated in FIG. 3, the image may be processed to determine whether it includes a pattern which could be a head (step 23), to determine the location of the eyes (step 24) and to determine whether it is an actual human face (step 25). Step 25 may be used to prevent a picture from being used under conditions in an authentication system when the individual is supposed to be present. If any of the characteristics of a face are not present, the image is rejected at step 27. The system may then seek to acquire another image 28, may notify a user that an image was not properly acquired, or may await further action by the operator. If an image of a face is acquired, then the image is processed to determine just the facial part of the image at step 26. The image can be scaled and cropped to eliminate easily changeable characteristics, such as the hair.

Figure 4:
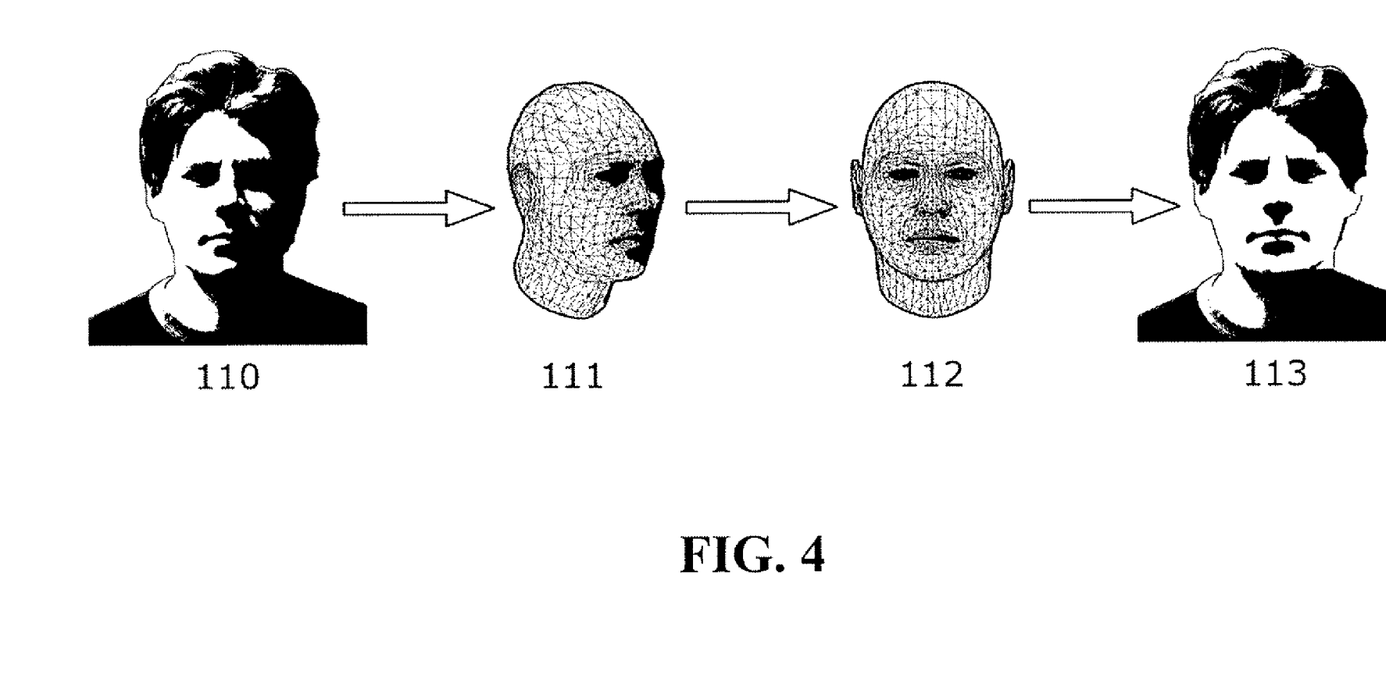
FIG. 4 is a flow diagram illustrating a process for correcting lighting according to an embodiment of the present invention.
Figure 5:
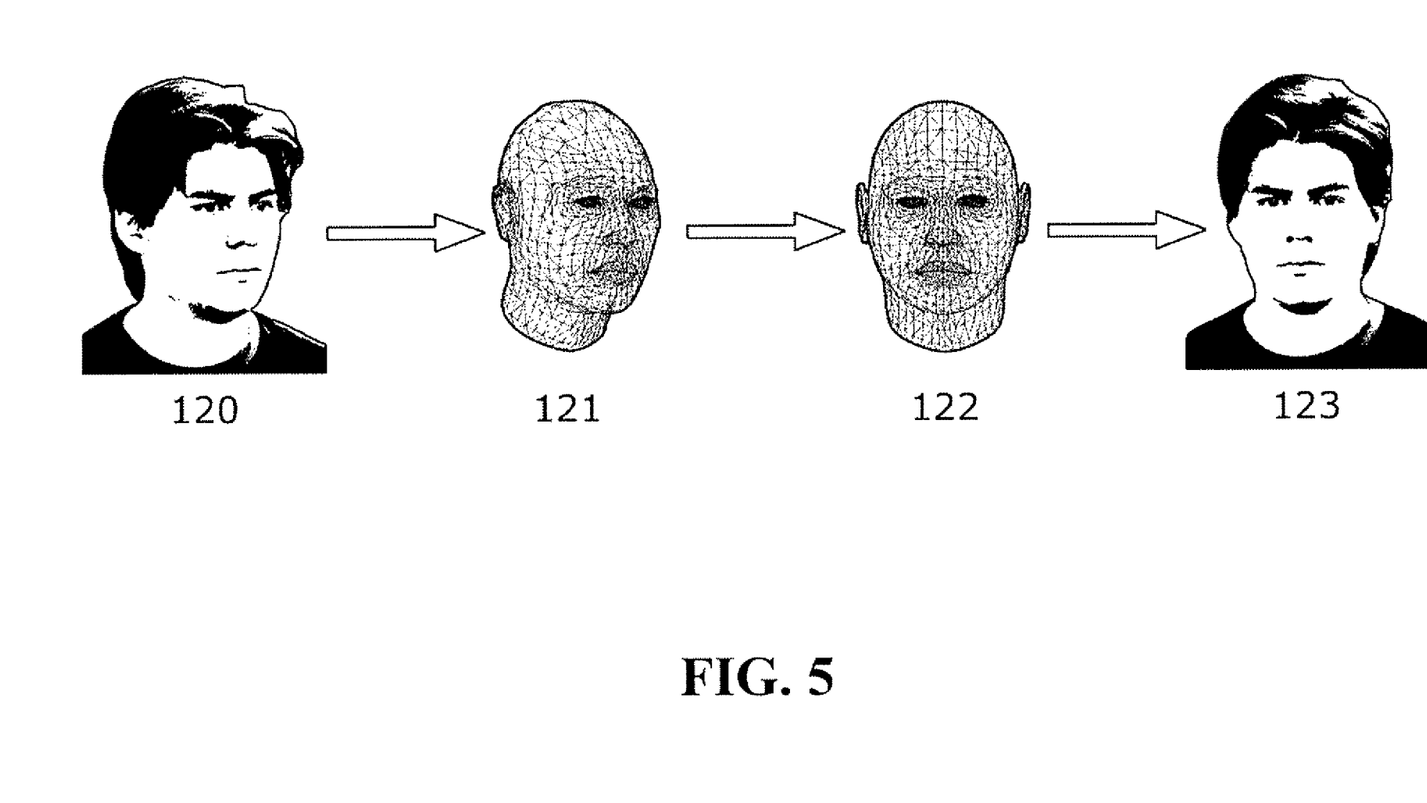
FIG. 5 is a flow diagram illustrating a process for correcting pose according to an embodiment of the present invention.

In step 30 (FIG. 2), the acquired image is processed to correct for light and pose. The process 30 for correcting for lighting is illustrated in FIG. 4. The process 30 for correcting for pose is illustrated in FIG. 5. The processes for correcting for light and pose are similar. According to the present invention, the two dimensional image is processed to create a three dimensional image. The three dimensional image can then be used to correct the light and/or pose. Whereupon, the image is converted back to a two dimensional image for comparison in the facial recognition engine 40.

As illustrated in FIG. 4, the correction process starts with an original image 110 with lighting errors. For comparison, the best lighting would be directly from the front of the face. However, images are usually acquired under a variety of lighting conditions. The original image 110 illustrates an image with lighting from the left side of the subject. Such lighting causes shadows on the right side of the subject's face. The first step in correcting for lighting is to create a three dimensional shape 111 based upon the original image. Creation of a three dimensional shape 111 is a process. First, the intensity information in the image is removed. Intensity information includes glares and shadows apparent in the original image. According to an embodiment of the present invention, intensity information also includes color. If computational power, memory and time were not limitations, the correction process could be performed using color images. However, the process would have to be repeated three times, once for each of the colors, at each iteration. Additionally, some images may not be in color and could not be processed in the same way. Therefore, in a preferred embodiment, color images are converted to grayscale images for processing.

Once intensity information has been removed from the image, a shape matrix is applied to the image data to create an initial three dimensional shape. The shape matrix may be created using empirical data from a prior study of the shape/image relation. A database of two dimensional facial images and corresponding three dimensional shapes is created. The database is used to calculate a covariance matrix between the space of shapes and the space of images within the database. Once a covariance matrix has been created, it can be used to generate an initial shape from a new image. The shape of the new image can be approximated by:

$$\text{Shape} = \text{Covariance Matrix} \times \text{Image}$$

The initial shape may be improved by acquiring and using multiple images of the subject, such as different frames from a security camera. Each image is processed to generate a shape using the covariance matrix. The resulting shapes are then averaged to create a single combined shape. Alternatively, the system could use a single predetermine, three dimensional shape based solely upon the two dimensional shape of the cropped image. However, this would limit the accuracy of the system.

According to another embodiment of the present invention, a standard shape is used as the initial three dimensional shape. The standard shape is created as an average shaped based upon collected data from many individuals. A standard shape can provide a reasonable starting point for the iterative process described below. While it is less accurate than the previously described procedure, the use of the standard image allows for a much simpler creation of the starting image.

Once an initial shape has been created from the image, the shape is adjusted using shape from shading techniques. Shape from shading is a well known technique for extracting three dimensional information from a two dimensional image. Although the theory of the shape from shading process is well studied, it is not very reliable. It is particularly inaccurate for images with discontinuities such as shadows, non-uniform illuminations, and glare. However, by starting with an estimate of shape, using the covariance matrix, the resulting shape can be reliably adjusted using shape from shading techniques. The first step is to apply a noise reduction. Noise reduction uses the initial shape to estimate areas affected by shadows or glare. By determining such areas, the system increases the stability of the shape from shading process.

According to the present invention, an iterative process is used to converge the shape to the best fitting solution for the two dimensional image. An initial light direction is approximated using the initial shape and the original image. A two dimensional image is rendered using known techniques from the current shape and lighting information. The two dimensional image is compared with the original image to determine differences. The shape is then adjusted based upon the determined light direction and the differences between the rendered and original images. After adjusting the shape, the light direction is again approximated and another two dimensional image is rendered. Adjustments to the light and shape are repeatedly made until the recovered shape and light direction best approximates the original image. An error value that measures the differences between the original image and an artificial image, created using the shape and light approximations, is used to judge when to end the iterative process. The process may stop once the error value reaches a predetermined threshold, when the error value does not change significantly between iterations or after a predetermined maximum number of iterations. Once the shape has been properly estimated, the three dimensional model needs to be adjusted to correct for the lighting. Specifically, the intensity mask for the face is restored using the determined shape. Image 112 illustrates the recovered shape with adjusted lighting. With a given three dimensional shape, two dimensional images can be created using any desired lighting conditions using Lambertian surface assumption. When the surface of an object is assumed to have a Lambertian reflectance property (meaning that it irradiated illuminating light uniformly in all directions) an image generation can be mathematically described $$\text{Image} = A * max(B * s, 0) \quad (1)$$

Where

A—Intensity, color map of the surface, $s=(s_1,s_2,s_3)$–Light-Source, $$B = \begin{pmatrix} n_1^1, n_2^1, n_3^1 \\ n_1^2, n_2^2, n_3^2 \\ ... \\ n_1^k, n_2^k, n_3^k \end{pmatrix}$$

matrix of normal vectors to the facial surface

In case of human flesh, a Lambertian assumption describes actual surface property almost perfectly. Using this assumption it is possible to generate artificial images, which would be hard to distinguish from naturally acquired ones. The final artificial image 113 is used in the facial recognition engine 40 for determining a matching image.

FIG. 5 illustrates the process for correcting pose. It is similar to the process for lighting correction and starts with an original image 120. In the original image 120, the subject is not necessarily looking at the camera. An objective of the facial recognition system of the present invention is to determine the direction of the face and to adjust it to create an artificial image with the user looking at the camera. As in the light correction process, a three dimensional shape 121 is reconstructed from the original image 120. The system uses a covariance matrix of shapes and poses. The method is based on the statistical training of the invariants and manipulations between the image and shape spaces. A database of facial images in different poses (with different angles of rotation in multiple directions) is collected. The database includes pose information which is recorded for each image. Each image is represented as a vector and such vectors are combined in a matrix.

An SVD method is performed on the images in the database to produce eigenvectors ($ESv_1, ESv_2, \ldots ESv_n$) and eigenvalues ($ES\lambda_1, ES\lambda_2, \ldots ES\lambda_n$) for a Shapes space, which would describe facial space including the pose variations. Once the axes (eigenvectors) that describe facial space are available, each image of the database is also represented as a set of coefficients in the representation of the eigenvectors. Thus, the database is in the form of:

Database:
$$\text{Shape } 1 = k_1^1 \frac{ESv_1}{ES\lambda_1} + k_2^1 \frac{ESv_2}{ES\lambda_2} + \ldots + k_N^1 \frac{ESv_N}{ES\lambda_N},$$
$$\text{Shape } 2 = k_1^2 \frac{ESv_1}{ES\lambda_1} + k_2^2 \frac{ESv_2}{ES\lambda_2} + \ldots + k_N^2 \frac{ESv_N}{ES\lambda_N},$$
$$\ldots$$
$$\text{Shape}N\ 1 = k_1^N \frac{ESv_1}{ES\lambda_1} + k_2^N \frac{ESv_2}{ES\lambda_2} + \ldots + k_N^N \frac{ESv_N}{ES\lambda_N},$$

where $k_i^j$ is a coeficient of the Shape representation in the Shape Eigenspace. Since the rotation information for each image is available, the correspondence between coefficient sets and rotation angle can be established. For example, it can be done with a covariance matrix. Alternatively, a table of possible coefficient sets for different angles of rotation can be drawn after a statistical study of the training set. Other processes may also be used for creating the initial three dimensional shape. A simple method is to use a standard facial shape created by combining data from many individuals. This average shape provides a starting point for the iterative adjustment process.

The shape covariance matrix is applied to the original image to estimate a shape. The pose is then estimated based upon the shape. As with the lighting process, the shape and pose are iteratively adjusted to obtain a best fit shape 121 for the data. Again, a two dimensional image is rendered at each iteration and compared to the original image. The shape and pose are adjusted based upon the differences between the original image and the rendered image. An error value is used to terminate the iterative process. After a shape has been determined, the shape can be used to correct for pose 122. The pose of the three dimensional face is changed so that the subject is looking at the camera. Again, after the adjustment, a two dimensional image 123 is created from the three dimensional shape. The process described above for creating a two dimensional image from the lighting adjustment process may be used.

The processes for adjusting lighting and shape have been described separately. These processes may also be combined to correct for both types of errors. In such a case, the processes may be used sequentially or simultaneously to determine the best fit three dimensional shape. Alternatively, the reconstructed shapes from the two processes could be combined to obtain an more accurate shape for later manipulation of lighting and pose.

Any known facial recognition techniques can be used with the modified images of the present invention. Furthermore, any image used in the facial recognition engine can be adjusted according to the processes of the present invention. Therefore, a plurality of images may be processed according to the present invention prior to being stored in the database. Additionally, the newly acquired image can be processed prior to comparison with the stored images.

According to an embodiment of the present invention, the standardized frontal images are compared to determine the degree of match to allow identification or verification of the identity of the subject. The images are represented with the coefficients of a basis function expansion. This achieves significant compression of the image data. In addition, the coefficients of the expansion support comparison of the facial images through computation of a distance measured in the space of the coefficients.

The basis functions selected to use for facial comparison are the independent components, as is known in the art. Independent component analysis provides a way to obtain components such that the coefficients are independent. This means that knowledge of a number of coefficients does not provide any information about the remaining coefficients. This choice of basis set results in a minimum redundancy representation. It is optimized in terms of representation of the image information content. This can be contrasted with the use of principal components as a basis set which produces a representation optimized for representation of image power and in which the coefficients are merely uncorrelated.

The independent components are obtained from analysis of a set of training images. The images are selected to be representative of the full variety of faces which must be recognized. The training set should be larger than the desired number of independent components by a factor four. From 100 to 500 independent components are used for facial recognition. There is a large literature describing computation of independent components. The FastICA algorithm is used in an embodiment of the present invention because it is fast and efficient.

The ICA coefficients are computed through performing dot products with a rasterized version of the image with the independent component vectors.

$$\Psi_i = \sum_j (I_j - M_j)x_{ij}$$

where M is the mean face calculated when the ICA representation was created from the training set and I is the image to be represented. The resultant coefficients are $\psi$.

The L2 distance between two coefficient vectors is given by:

$$d^2 = (\psi_a - \psi_b)^T (\psi_a - \psi_b)$$

There is noise in the coefficients for a single person, which can contribute to the apparent distance between two images of the same person. Here we describe our method of reducing the effect of these residual errors in the coefficients.

The variation of images of the same person can be characterized by a covariance matrix. The covariance matrix is calculated in the reduced space of ICA faces which reduces the $$C = \Sigma(\psi-\mu)(\psi-\mu)^T$$

dimensionality of the problem. The covariance matrix is a composite one averaged over many individuals.

Here $\psi$ represents the vector of ICA coefficients of a particular image realization for the individual and $\mu$ represents the mean vector of ICA coefficients for that individual. The L2 distance, taking into account the covariance, assuming the coefficients have errors which are gaussian random variables is:

$$d^2 \text{corrected} = (\psi_a - \psi_b)^T C^{-1} (\psi_a - \psi_b)$$

The covariance can be diagonalized using singular value decomposition.

$$C = FSF^T$$

Here F contains the eigenvectors of the covariance matrix and S contains the corresponding eigenvalues. The eigenvectors, F, are orthogonal directions in coefficient space which represent the variations of images of the same individual ordered by the size of the eigenvalues. The larger eigenvalues correspond to variations that are stronger or more frequent. The inverse of the covariance matrix is calculated in terms of F and S.

$$C^{-1} = FS^{-1}F^T$$

Thus compensated distance calculations are obtained using $\psi'$, where $$\psi' = S^{-1/2} F^T \psi$$

Since S is diagonal, its inverse square root is made up of the inverse square roots of the coefficients.

$$S^{-1/2}{}_{ii} = 1/\sqrt{S_{ii}}$$

Some face recognition applications have especially high accuracy requirements. Various approaches can be used with the present invention to increase accuracy. According to a first embodiment, the three dimensional shape information generated in creating the frontal images is used for recognition as well. The three-dimensional model of derived from the test image to the three-dimensional model for the enrolled images to determine the extent of fit. Alternatively, the comparison can be made in terms of coefficients of a basis function expansion for the shape of the face.

Another embodiment of the present invention can take advantage of the richer information content of color images. The approach here is to expand the image vector by a factor of three to contain color images. The extra detail on facial wrinkles in the blue image, and the low noise representation of major facial features in the red band provide enhanced discrimination. The processing of the images in this embodiment is similar to that of the other embodiments. However, the images created from each color are considered separately and then combined. The images can be combined at various times. For example, the original image may be separated into individual colors. A shape may be determined based upon each color considered separately. The shapes determined from each of the colors can then be combined to create a final shape. Alternatively, a shape can be used with each color. At each iteration, the shape is adjusted based upon differences for each color. Thus, the final shape is determined from all of the colors jointly.

The processing system of the present invention, as described above, creates three dimensional shapes from two dimensional images. It further creates adjusted two dimensional images after adjusting for lighting and pose. Although the system is described as being used for an identification system, it may be used in other manners for image processing. For example, an identification system includes a database of stored images. The processing system of the present invention may be used to correct lighting and pose on the images prior to storage in the database.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A processor-implemented method of processing an image of a face, the method comprising:
   receiving a two dimensional facial image, the facial image having been captured from a viewpoint;
   combining the two dimensional facial image and a standard three dimensional facial image to create a modified three dimensional facial image;
   adjusting an orientation of the modified three dimensional facial image with respect to said viewpoint; and
   with respect to said viewpoint, rendering a two dimensional image from the adjusted three-dimensional facial image, wherein combining, adjusting and rendering are performed by a processor system and wherein combining includes:
   performing a sequence of steps involving:
      combining the two dimensional facial image and standard three dimensional facial image to create a first intermediate three dimensional facial image;
      rendering a first intermediate two dimensional facial image based upon the first intermediate three dimensional facial image; and
      comparing the first intermediate two dimensional facial image to the two dimensional facial image; and
   after performing said sequence of steps, modifying the first intermediate three dimensional facial image based upon results from performing said sequence of steps.

2. The method of claim 1, wherein the standard three dimensional facial image is generated by receiving a plurality of three dimensional facial images and combining the plurality of three dimensional facial images to generate the standard three dimensional facial image.

3. The method of claim 1, wherein combining the two dimensional facial image and the standard three dimensional facial image to create a modified three dimensional facial image further includes performing the sequence of steps a plurality of times.

4. The method of claim 1, further comprising:
   rendering a final two dimensional image from the three dimensional facial image according to a selected lighting.

5. The method of claim 1, further comprising:
   comparing the rendered adjusted two dimensional facial image to at least one stored two dimensional facial image to determine a match.

6. A system for identifying an individual, said system comprising:

a camera for acquiring a two dimensional facial image of a person's head from a viewpoint relative to the person's head;

means for creating a three dimensional facial image from the two dimensional facial image;

means for adjusting an orientation of the three dimensional facial image with respect to said viewpoint;

means for rendering with respect to said viewpoint a final two dimensional image from the adjusted three dimensional image; and means for comparing the final two dimensional image to at least one stored two dimensional image to determine a match, wherein the means for creating a three dimensional facial image includes:

means for combining the two dimensional facial image with a standard three dimensional facial image to create an intermediate three dimensional facial image; and means for rendering an intermediate two dimensional facial image from the intermediate three dimensional facial image;

means for comparing the intermediate two dimensional facial image to the two dimensional facial image; and means for adjusting the intermediate three dimensional facial image based upon results of the comparison of the intermediate two dimensional facial image to the two dimensional facial image.

7. The system for identifying an individual according to claim 6, further comprising:
a database of stored two dimensional images; and
wherein the means for comparing includes means for comparing the final two dimensional image to at least one stored two dimensional image in the database of stored two dimensional images.

8. The system for identifying an individual according to claim 7, wherein the means for comparing includes means for comparing the final two dimensional image to a plurality of stored two dimensional images in the database to determine a closest match.

9. The system for identifying an individual according to claim 6, wherein the means for rendering includes means for rendering the final two dimensional facial image based upon a selected lighting.

* * * * *

UNITED STATES PATENT AND TRADEMARK OFFICE
CERTIFICATE OF CORRECTION

PATENT NO. : 7,643,671 B2  Page 1 of 1
APPLICATION NO. : 10/761667
DATED : January 5, 2010
INVENTOR(S) : Dong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Twenty-first Day of December, 2010

David J. Kappos
*Director of the United States Patent and Trademark Office*